Sept. 1, 1964 B. R. HEYMANN ETAL 3,146,757
DIFFERENTIAL PRESSURE INDICATOR
Filed May 31, 1961 2 Sheets-Sheet 1

BERNARD R. HEYMANN
RAYMOND L. HUFFMAN
INVENTORS.

BY Lawrence J. Winter
ATTORNEY

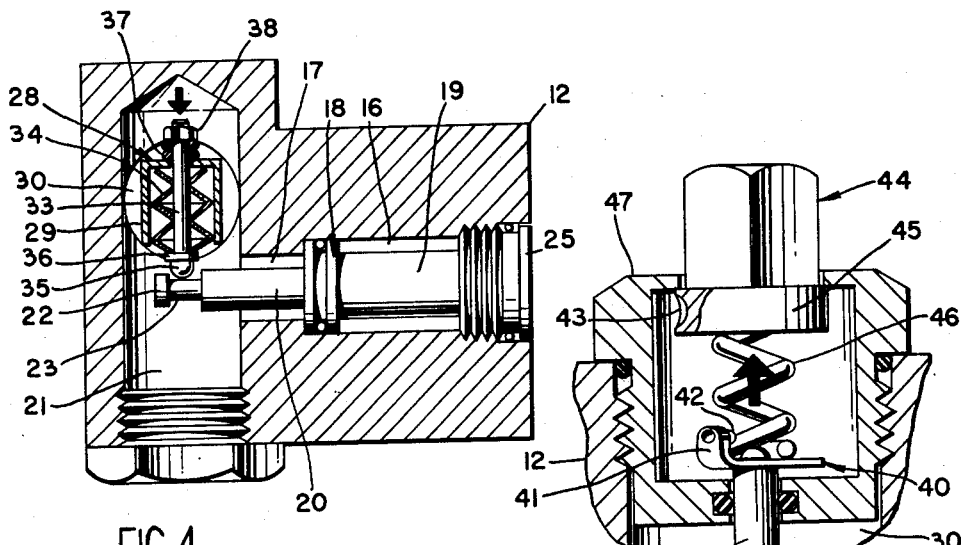
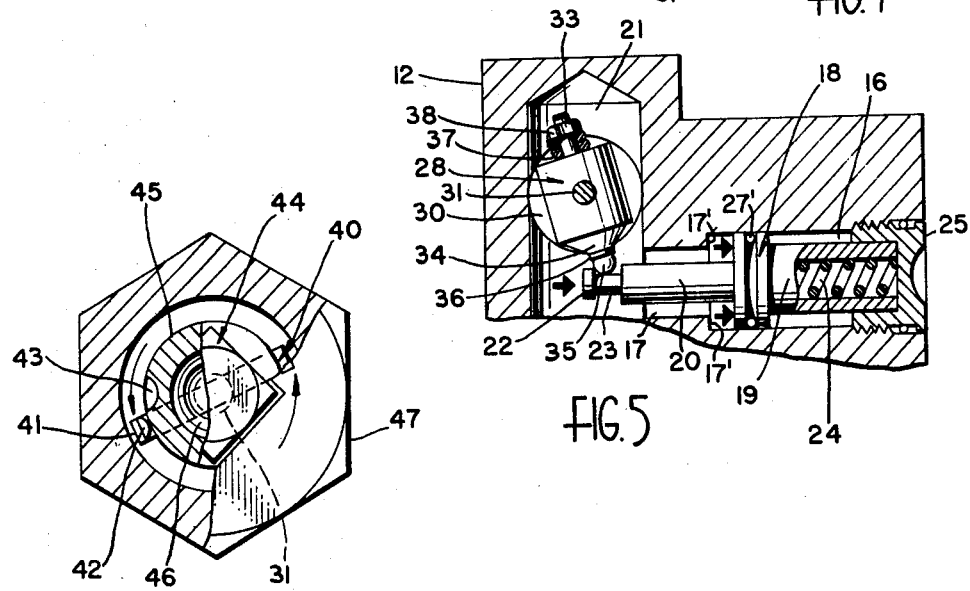

3,146,757
DIFFERENTIAL PRESSURE INDICATOR
Bernard R. Heymann, 3243 Vickers Drive, and Raymond
L. Huffman, 318 E. Palmer, both of Glendale, Calif.
Filed May 31, 1961, Ser. No. 149,474
(Filed under Rule 47(b) and 35 U.S.C. 118)
12 Claims. (Cl. 116—70)

The present invention relates to a differential pressure indicator, and more particularly, to a differential pressure indicator which will indicate when a filter element has become clogged with contaminants.

An object of the present invention is to provide a differential pressure indicator provided with pressure-sensing piston in which the movement of the piston is transmitted to a swivel shaft which releases the indicator button at a predetermined angle of rotation through a temperature-sensing gimbal-like structure positioned normal to the piston, and adapted to engage the piston when the temperature of the liquid flowing through the filter element is above a predetermined value.

Another object of the present invention is to provide a differential pressure indicator device having a temperature-sensitive gimbal-like structure which has sufficient force and displacement to withdraw from engagement with the movable piston at low temperatures so that the indicator device will not give a false signal that the filter has become clogged due to cold viscous liquid flowing through the filter element.

Various other objects and advantages of the present invention will be readily apparent from the following detailed description, when considered in connection with the accompanying drawings forming a part thereof, and in which:

FIG. 4 is a plan view similar to FIG. 2, with the gimbal structure in section and showing the operative position of the differential pressure indicator with the gimbal structure engaging the movable piston when the temperature of the liquid is above a predetermined value;

FIG. 5 is a view similar to FIG. 4, with the lower portion broken away showing the temperature-sensing gimbal structure engaged with the movable piston, illustrating the angular movement of the gimbal structure when the indicator button is released to a signal position;

FIG. 6 is an enlarged plan view of the indicator button and plug member in section with the indicator button in its signal positon; and FIG. 7 is an enlarged view of the indicator button in its signal position extending above the filter housing.

Figure 1:
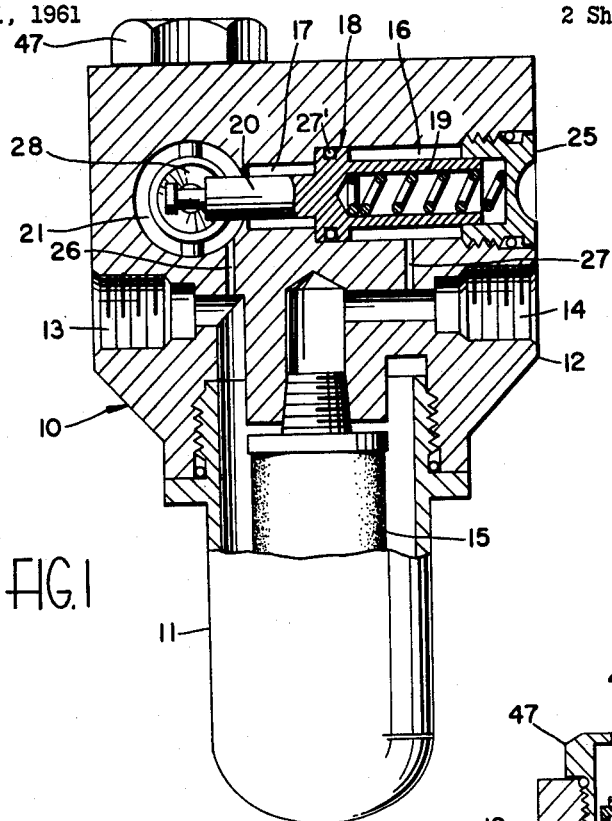
FIG. 1 is a vertical elevation, partly in section, showing the differential pressure indicator in a non-operative position when cold liquid is being flowed therethrough, illustrating the inlet and outlet ports communicating with the piston chamber and gimbal chamber.

Referring to the drawings, the reference numeral 10 generally designates a filter assembly comprising a cylindrical case 11 threadably connected in a fluid-tight relationship to a head 12. The head is provided with a threaded inlet passage or port 13 and outlet passage 14 which communicate with the casing 11. A cylindrical filter element 15 is disposed in the casing and is threadably connected to the lower end of the outlet port 14. A horizontal bore extends above outlet passage 14 to form a piston chamber or cylinder 16 therein. The inner end 17 of this chamber has a reduced diameter to provide a stop for a reciprocating piston 18 in the chamber.

Figure 2:
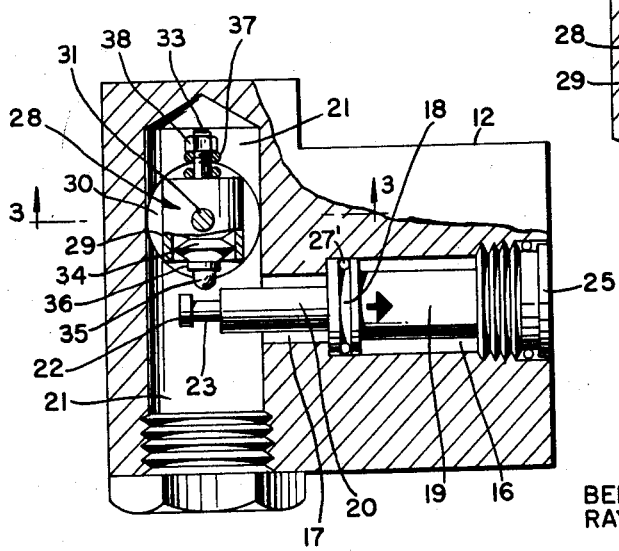
FIG. 2 is a top plan view of FIG. 1, partly in section, showing the piston and gimbal chambers with the gimbal structure disengaged from the piston, when the temperature of the liquid is below a predetermined value.

Piston 18 has a hollow cylindrical extension 19 on its outer end and a rod extension 20 on its inner end that extends into a horizontal gimbal chamber 21. Chamber 21 is disposed normal to the piston chamber 16 and in alignment therewith, as seen in FIGS. 1 and 2. Rod 20 has a reduced end 22 provided with a circumferential groove or recess 23 therein. Hollow extension 19 has a tension spring 24 mounted therein which seats against a hollow plug 25 threaded into the end of the piston chamber to prevent any oil from leaking from the piston head. The tension spring normally holds the piston positioned adjacent the left end of the piston chamber against the shoulder 17' formed by the reduced end 17 of the piston chamber. A drilled inlet passage 26 is provided in the head between inlet passage 13 and gimbal chamber 21 so that oil pressure on the upstream side of the filter element is transmitted against the left end of piston 18 while the oil pressure on the downstream side of the filter element is transmitted to the opposite side of the piston by drilled passage 27 extending between chamber 16 and outlet passage 14. A conventional O-ring seal 27' in the piston prevents leakage of oil around the edge of the piston.

Figure 3:
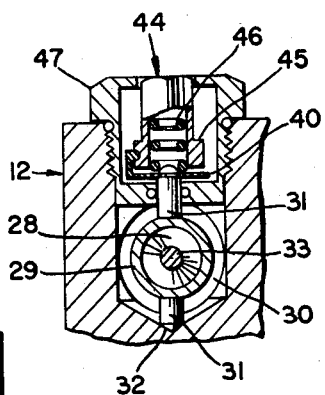
FIG. 3 is a section taken on line 3—3 of FIG. 2, illustrating the gimbal chamber and swiveled gimbal and release means for the indicator button.

A gimbal-like structure 28 is disposed in one end of gimbal bore 21 (FIG. 4) comprising an open end horizontal cylindrical casing 29 fixed to a split vertical shaft 31 (FIG. 3). Shaft 31 is supported in a recess 32 so that casing and shaft can freely pivot or swivel around this recess fulcrum point. A horizontal shaft 33 (FIGS. 2, 4) extends through casing 29 and has a plurality of bimetallic bellows-shaped discs 34 mounted thereon. Discs 34 are free to expand and contract with changes in temperature. The end of shaft 33 adjacent rod 20 is provided with a ball detent 35 adapted to engage in slot 23 of the rod when the oil temperature is above a predetermined value. A retainer washer 36 is disposed on the shaft adjacent ball detent 35 and a tension spring 37 is mounted on the opposite end of the shaft outside of the casing. A retainer nut 38 is threaded on the shaft to hold the spring and keep the bimetallic discs within casing 29. As the bimetallic discs expand due to an increase in oil temperature, the ball detent 35 will extend into the groove 23 of rod 20, as best seen in FIG. 4. When the bimetallic discs are contracted, detent 35 will become disengaged from slot 23, as best seen in FIG. 2, with the tension spring 37 taking up the slack and moving shaft 33 away from the rod.

Gimbal structure 28 is disposed in alignment with a vertical bore or chamber 30 in the head. The upper end of vertical pivoted shaft 31 has fixed thereon a horizontal detent arm 40 (FIG. 7) with a resilient vertical leg or arm 41 turned inwardly, having a ball surface 42 normally seated in a curved slot 43 (FIGS. 6, 7) of an indicator button 44. Detent arm 40 swivels or pivots with shaft 31 so that ball surface 42 of resilient arm 41 is forced out of slot 43 upon sufficient angular rotation or displacement of shaft 31 to the position shown in FIGS. 6 and 7.

The indicator button 44 comprises a hollow square sleeve (FIG. 3) having an enlarged circular flange 45 on the lower end thereof in which the slot 43 is disposed. A compression spring 46 (FIG. 3) is disposed within the indicator button and has its lower end fixed to shaft 31 by any conventional means, so that the indicator button is normally urged toward a signal position. However, the force of the spring is not sufficient to overcome the frictional force holding ball surface 42 in slot 43 until shaft 31 has been angularly displaced to move ball 42 out of the slot.

A threaded hollow plug 47 having a square opening therein closes off bore 30 and surrounds the indicator button with the top of the plug acting as a stop against which flange 45 abuts when the signal device has been released to its signal position extending above the housing. The square opening in plug 47 prevents the square indicator button from turning since a portion of the button is always engaged within the opening.

In operation, liquid to be filtered is flowed through inlet passage 13 in the filter assembly, passes through the filter element 15 and is discharged through outlet port 14. The upstream and downstream oil pressures are transmitted to both sides of piston 18 through connecting passages 26 and 27 in communication with the opposite sides of the piston. During this time, spring 24 normally holds piston 18 seated against the shoulder formed by reduced cylindrical portion 17 of the piston chamber.

When the temperature of the oil flowing through the filter is below the temperature of 50° F., and is thus in a cold and viscous state, the bimetallic discs 34 are in a fully contracted position, as best seen in FIG. 2, so that the ball detent 35 is thus clear of slot 23 in rod 20 of the piston so that any differential pressure across the filter element which will move piston 18 will not falsely release the indicator button 44 to signal the filter needs replacement. At this time, the resilient ball surface 42 of detent arm 41 is engaged in slot 43 of the indicator button and the button is enclosed or hidden within plug 47 in its non-signalling position, since the force in spring 46 is not sufficient to force the button upwardly while the ball detent is disposed within the slot.

When the temperature of oil flowing through the filter has increased above 50° F., the heat of the oil causes the bimetallic discs 34 to expand, so that rod 38 moves toward piston 18 and ball detent 35 is engaged in slot 23 of rod 20, as seen in FIG. 4. When the differential pressure across the filter element increases above the force of spring 24 maintaining the piston 18 disposed adjacent the left end of the cylinder 16, the excess force causes the piston to move to the right end of the cylinder, as shown in FIG. 5, and gimbal structure 28 will rotate angularly about recess 32 approximately 45 degrees, as illustrated in FIG. 5. The turning or swiveling of shaft 31 will angularly displace detent arm 41 since it is fixed to the shaft. Detent arm 41 moves in the direction indicated by the arrows in FIG. 6 and ball surface 42 springs out of slot 43. The indicator button will not turn since it is engaged in the square opening of plug 47. The force in indicator button spring 46 then causes the indicator button to pop upwardly through the square opening in plug 47 to the position shown in FIG. 7, thereby indicating that the filter has become clogged from contaminants and needs replacing.

Thus, the present invention provides an indicator device having a differential pressure-sensing piston which engages a temperature-sensing gimbal structure when the temperature of the liquid being filtered is above a predetermined value to indicate when a filter has become actually clogged due to contamination, and which device will not give a false signal when viscous liquid is flowed therethrough.

Inasmuch as various changes may be made in the form, location and relative arrangement of the several parts without departing from the essential characteristics of the invention, it will be understood that the invention is not to be limited except by the scope of the appended claims.

What is claimed is:

1. A differential pressure indicator comprising a movable piston movable by a predetermined differential pressure acting thereacross, temperature sensing means comprising a rotatable gimbal, said gimbal being engaged with said piston when the temperature exceeds a predetermined value and rotatable by said piston when said predetermined differential pressure is exceeded, and a signal member operatively connected to said gimbal and movable to a signal position when said gimbal rotates a predetermined distance.

2. A differential pressure indicator comprising a housing with a horizontal cylinder and a movable piston therein, said piston being movable by a predetermined differential pressure acting thereacross, another cylinder in communication with said first mentioned cylinder with a temperature sensing rotatable gimbal therein, said gimbal being engaged with said piston when the temperature exceeds a predetermined value and rotatable by said piston when said predetermined differential pressure is exceeded, and a signal member operatively connected to said gimbal and movable to a signal position when said gimbal rotates a predetermined distance.

3. A differential pressure indicator comprising a housing having a first cylinder and a second cylinder normal to said first cylinder and communicating therewith, a differential pressure piston slidably disposed in said first cylinder, said piston being slidable by a predetermined differential pressure across said piston, said piston having an extension with a recess projecting into said second cylinder, a vertical pivoted shaft disposed in said second cylinder, a temperature sensing rotatable member carried by said shaft and engageable in said recess, when the temperature exceeds a predetermined value and being rotated by said piston when said predetermined differential pressure is exceeded, and a signal member operatively connected to said temperature sensing member and movable to a signal position when said sensing member is pivoted a predetermined distance by said piston.

4. A differential pressure indicator comprising a housing having a first cylinder and a second cylinder normal to said first cylinder and in communication therewith, a differential pressure piston slidably disposed in said first cylinder, an extension with a recess therein on said piston, said extension projecting into said second cylinder, a vertical pivoted shaft disposed in said second cylinder, a temperature sensing member carried by said pivoted shaft comprising a horizontal shaft with bimetallic means disposed thereon to lock the horizontal shaft in said recess when the temperature exceeds a predetermined value, and a signal member operatively connected to said vertical shaft and movable to a signal position when said vertical shaft is angularly displaced through a predetermined angle.

5. A differential pressure indicator comprising a housing having a first cylinder and a second cylinder normal to said first cylinder and in communication therewith, a differential pressure piston slidably disposed in said first cylinder having an extension with a recess therein projecting into the second cylinder, a vertical pivoted shaft in said second cylinder, a horizontal shaft carried by said vertical shaft, bimetallic discs and biasing means on said horizontal shaft, said horizontal shaft being positioned to move toward and away from said recess, and to engage in said recess when the temperature exceeds a predetermined value for angular rotation of said vertical shaft by said piston, and a signal member operatively connected to said vertical shaft for release to a signal position when said vertical shaft is displaced through a predetermined angle.

6. A differential pressure indicator comprising a housing having a first cylinder and a second cylinder normal to said first cylinder and communicating therewith, a differential pressure piston slidably disposed in said first cylinder, said piston having an extension with a recess projecting into said second cylinder, a vertical pivoted shaft disposed in said second cylinder, a horizontally movable temperature sensing member carried by said shaft engageable in said recess for pivotal movement thereby when the temperature exceeds a predetermined value, a third cylinder in said housing with a signal member therein, and resilient detent means operatively connected to said pivoted shaft to release said member to a signal position when said shaft is pivoted through a predetermined angle.

7. The indicator of claim 6 wherein said signal member comprises a spring biased indicator button, and said detent means comprises a horizontal arm fixed to said pivoted shaft and a resilient vertical arm having a ball detent connected thereto.

8. A filter indicator for signalling when the filter has become clogged, comprising a housing having a first cylinder and a second cylinder normal to said first cylinder and in communication therewith, a differential pressure piston slidably disposed in said first cylinder, said piston having an extension with a recess projecting into said second cylinder, a filter having its upstream side in communication with one side of said piston and its downstream side in communication with the opposite side of said piston, a vertical pivoted shaft disposed in said second cylinder, a temperature sensing member carried by said shaft and engageable in said recess for movement by said piston when the temperature exceeds a predetermined value, and a signal member operatively connected to said temperature sensing member and movable to a signal position when said sensing member is pivoted through a predetermined angle by said piston.

9. A filter indicator for signalling when the filter has become clogged comprising a housing having a first and second cylinder with said second cylinder disposed normal to the first cylinder and in communication therewith, a differential pressure piston slidably disposed in said first cylinder having an extension with a recess projecting into said second cylinder, a filter having its upstream side in communication with the opposite side of said piston, a vertical pivoted shaft in said second cylinder, a horizontal shaft carried by said vertical shaft, bimetallic discs and biasing means on said horizontal shaft, said horizontal shaft being positioned to move toward and away from said recess, and to engage in said recess when the temperature exceeds a predetermined value for angular rotation of said vertical shaft by said piston, and a signal member operatively connected to said vertical shaft for release to a signal position when said vertical shaft is pivoted through a predetermined angle.

10. A differential pressure indicator comprising a housing having an inlet and outlet, first cylinder means in said housing, piston means in said cylinder means in communication with said inlet and outlet to permit fluid pressure corresponding to the fluid pressure at said inlet and outlet to act against said piston means, said piston means being movable by a differential pressure thereacross exceeding a predetermined value, second cylinder means in said housing adjacent one end of said first cylinder means and in communication therewith, extension means fixed to said piston means for movement therewith and projecting into said second cylinder means, means normally urging said piston means toward said second cylinder means, rotatable shaft means in said second cylinder means, expansible temperature sensing means carried by said rotatable shaft means for rotation thereby, said temperature sensing means being disposed to engage said extension means when the temperature of fluid passing through the housing is above a predetermined value, and disposed to be disengaged therefrom when said temperature is below said predetermined value and signal means operatively connected to said rotatable shaft means and movable to a signal position when said shaft means is rotated by said extension means and piston means.

11. The indicator of claim 10 wherein said shaft means is vertically disposed, said extension means is horizontally disposed, and said temperature sensing means is horizontally disposed in the same plane as said extension means.

12. The indicator of claim 10 wherein said expansible temperature sensing means includes a plurality of bimetallic bellows shaped members.

References Cited in the file of this patent
UNITED STATES PATENTS
2,979,021   Scavuzzo _____ Apr. 11, 1961